United States Patent
Ho

(10) Patent No.: US 6,435,134 B1
(45) Date of Patent: Aug. 20, 2002

(54) DRINKING APPARATUS FOR PETS

(76) Inventor: Ying-Kuan Ho, No. 34, Lane 87, Fu I Street, Chi Tu, Keelung (TW), 206

( * ) Notice: Subject to any disclaimer, the term of this patent is extended or adjusted under 35 U.S.C. 154(b) by 0 days.

(21) Appl. No.: 09/756,044

(22) Filed: Jan. 8, 2001

(51) Int. Cl.[7] .............................. A01K 7/00; A01K 7/02; A01K 39/02
(52) U.S. Cl. ........................... 119/72; 119/464; 119/477
(58) Field of Search ........................... 119/72, 464, 477, 119/72.5, 475, 456, 454, 51.5; 248/62, 65, 74.3, 74.2, 103

(56) References Cited

U.S. PATENT DOCUMENTS

| | | | | |
|---|---|---|---|---|
| 5,301,634 A | * | 4/1994 | Ho | 119/477 |
| 5,447,118 A | * | 9/1995 | Huff et al. | 119/475 |
| 5,549,074 A | * | 8/1996 | Hui | 119/477 |
| 5,669,329 A | * | 9/1997 | Krause | 119/72.5 |
| 5,934,222 A | * | 8/1999 | Hwang | 119/72 |
| 6,189,489 B1 | * | 2/2001 | Pearce | 119/477 |
| 6,293,226 B1 | * | 9/2001 | Hwang | 119/72 |

* cited by examiner

*Primary Examiner*—Charles T. Jordan
*Assistant Examiner*—John W. Zerr

(57) ABSTRACT

A drinking apparatus for pets includes a mounting device for mounting, the mounting device having a C-shaped feeder holder and a positioning groove of T-shaped cross section disposed in the C-shaped feeder holder on the middle, and a water feeder mounted in the C-shaped feeder holder and adapted to provide a supply of water to pets, the water feeder having a peripheral top flange supported above the C-shaped feeder holder, and two locating rods of T-shaped cross section selectively engaged into the positioning groove.

1 Claim, 6 Drawing Sheets

DRINKING APPARATUS FOR PETS

BACKGROUND OF THE INVENTION

The present invention relates to a drinking apparatus for pets and, more particularly, to a simple, durable structure of drinking apparatus for pets, which is easy to install.

FIGS. from 1 through 3 show a drinking apparatus for pets according to the prior art. This structure of drinking apparatus comprises a water feeder 1, and a mounting device 2 adapted to secure the water feeder to a support or the meshed wall of a pet cage. The water feeder 1 comprises a peripheral top flange 11, a middle collar 14, and two symmetrical pairs of locating ribs 15 bilaterally disposed above and below the collar 14. The mounting device 2 comprises a feeder holder 21 made of flexible material, and two locating grooves 22 disposed in the feeder holder 21 at two sides. The water feeder 1 is vertically mounted in the feeder holder 21 of the mounting device 2, with one pair of locating ribs 15 engaged into the locating grooves 22 and the peripheral top flange 11 or middle collar 14 supported above the feeder holder 21. When the pet pushes the ball 12 with the tongue, the water outlet 13 of the water feeder 1 is opened to let water flow out of the water feeder 1 for drinking. This structure of drinking apparatus has numerous drawbacks as outlined hereinafter.

1. Not durable in use: Because the water feeder 1 is directly forced into the feeder holder 21 or pulled out the feeder holder 21 through the opening defined between two distal ends of the C-shaped holder wall of the feeder holder 21, the feeder holder 21 tends to be permanently deformed or damaged after long uses, causing the water feeder 1 unable to be positively secured to the feeder holder 21.
2. Not orthopedically engineered: Because the upper half of the water feeder 1 must be kept in vertical during installation, it is inconvenient to fasten the water feeder 1 to the feeder holder 21 of the mounting device 2 in the narrow cage space. Much effort should be employed when fastening the water feeder 1 to the mounting device 2.
3. Easy to damage the support: Because much effort is employed to the water feeder 1 when fastening the water feeder 1 to the mounting device 2, the support (meshed wall of the pet cage) tends to be permanently deformed or damaged.

SUMMARY OF THE INVENTION

The present invention has been accomplished to provide a drinking apparatus for pets, which eliminates the aforesaid drawbacks.

It is one object of the present invention to provide a drinking apparatus for pets, which is durable in use.

It is another object of the present invention to provide a drinking apparatus for pets, which is orthopedically engineered.

It is still another object of the present invention to provide a drinking apparatus for pets, which does not cause damage to the support during its installation.

To achieve these and other objects of the present-invention, a drinking apparatus is provided; comprised of a mounting device for mounting, the mounting device having a C-shaped feeder holder made of rigid material and a positioning groove of T-shaped cross section disposed in the C-shaped feeder holder on the middle, and a water feeder mounted in the C-shaped feeder holder and adapted to provide a supply of water to pets, the water feeder having a peripheral top flange supported above the C-shaped feeder holder, and two locating rods of T-shaped cross section selectively engaged into the positioning groove. Because the C-shaped feeder holder is made of rigid material, it does not deform when it receives a pressure from the water feeder.

DETAILED DESCRIPTION OF THE PREFERRED EMBODIMENT

Figure 1:
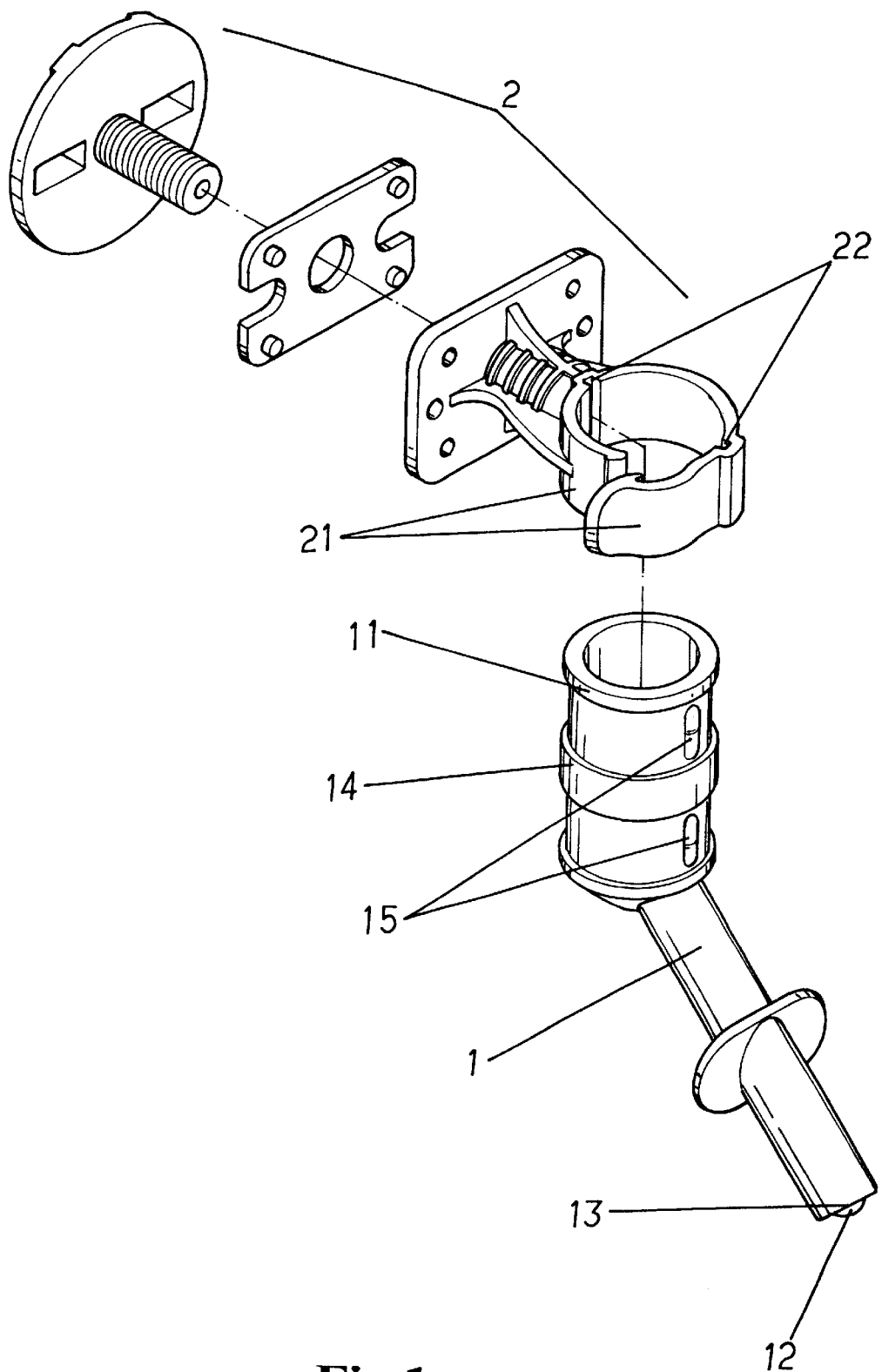
FIG. 1 is an exploded view of a drinking apparatus according to the prior art.
Figure 2:
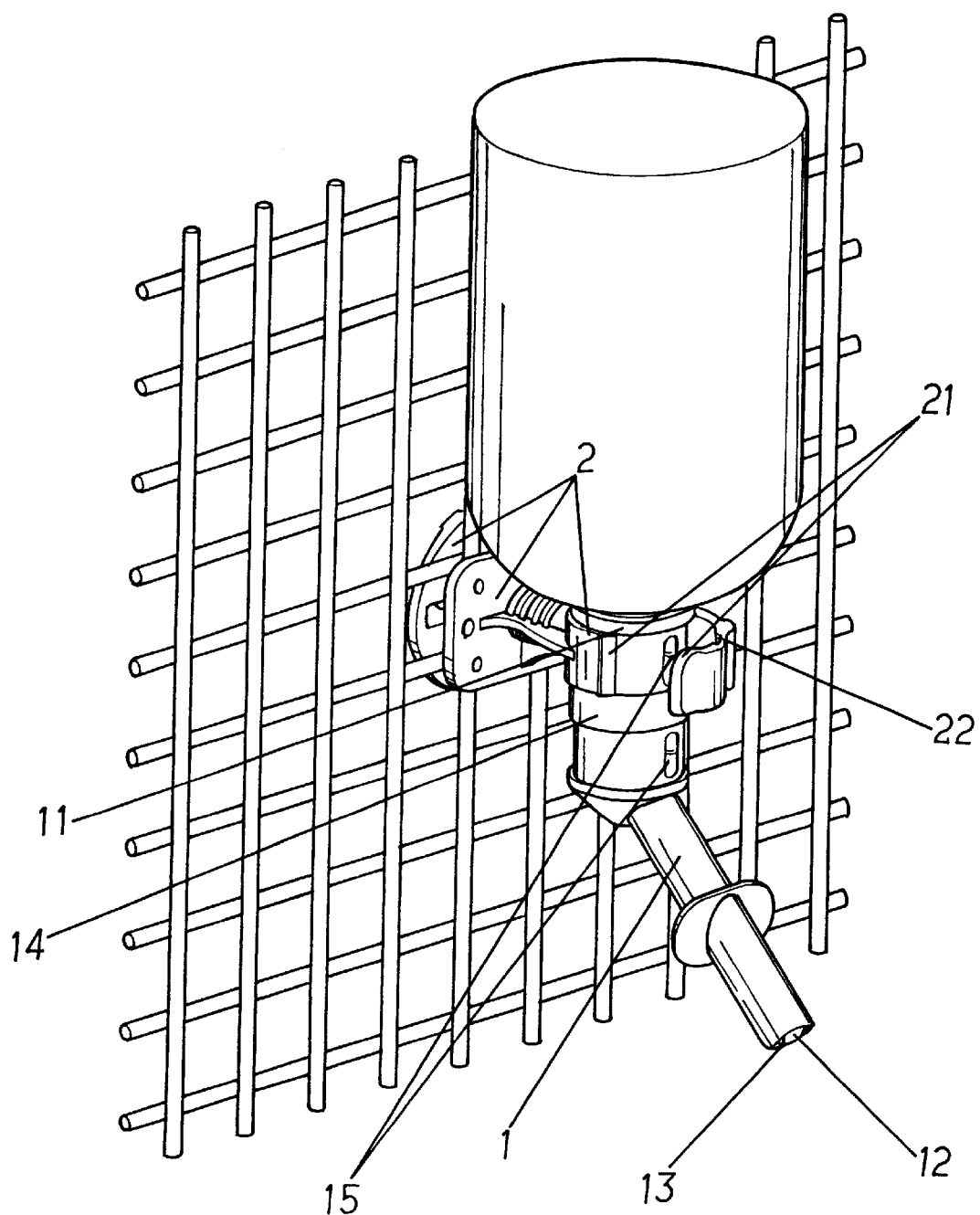
FIG. 2 shows the installation of the prior art drinking apparatus.
Figure 3:
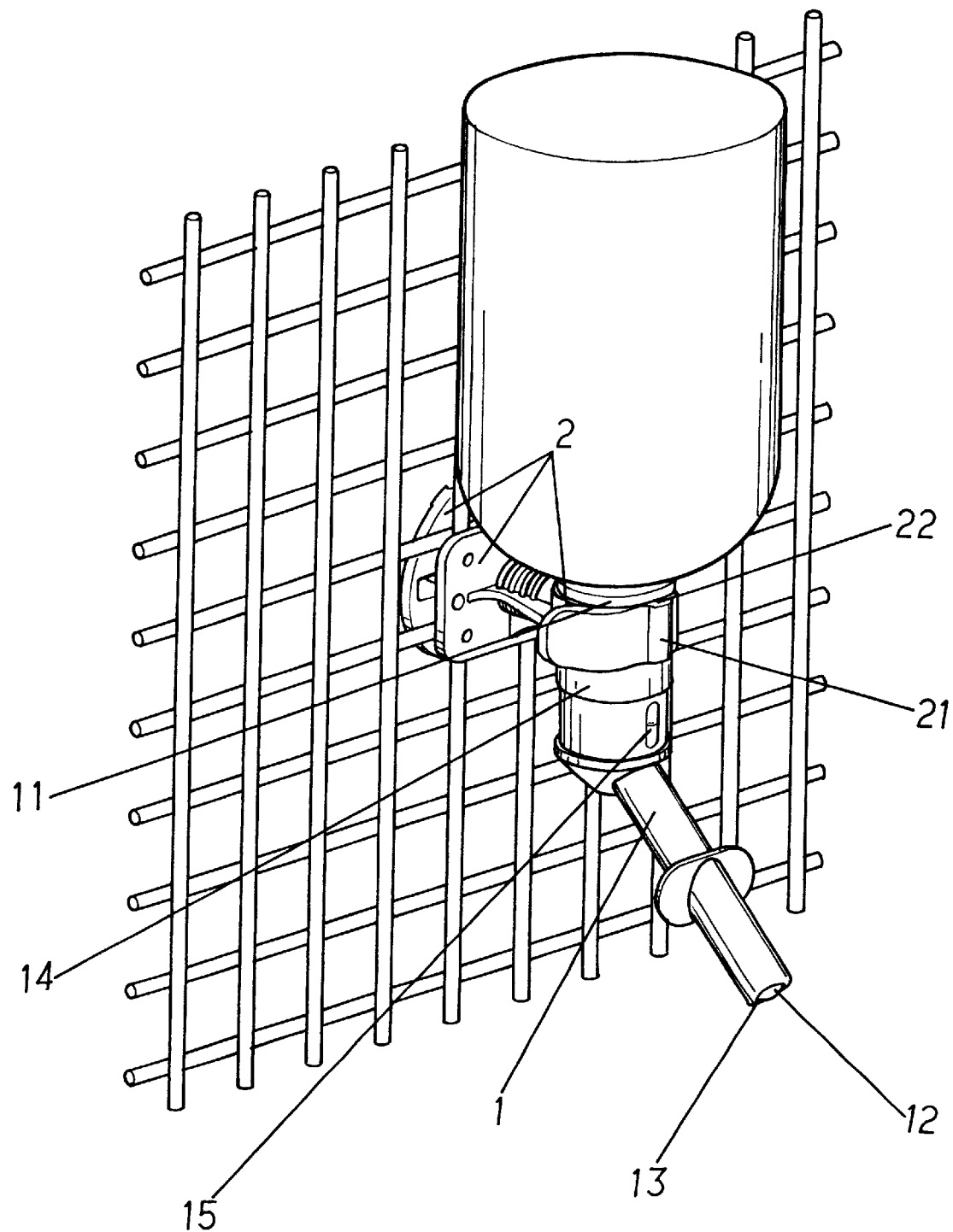
FIG. 3 is a perspective view showing the status of the prior art drinking apparatus after installation.
Figure 4:
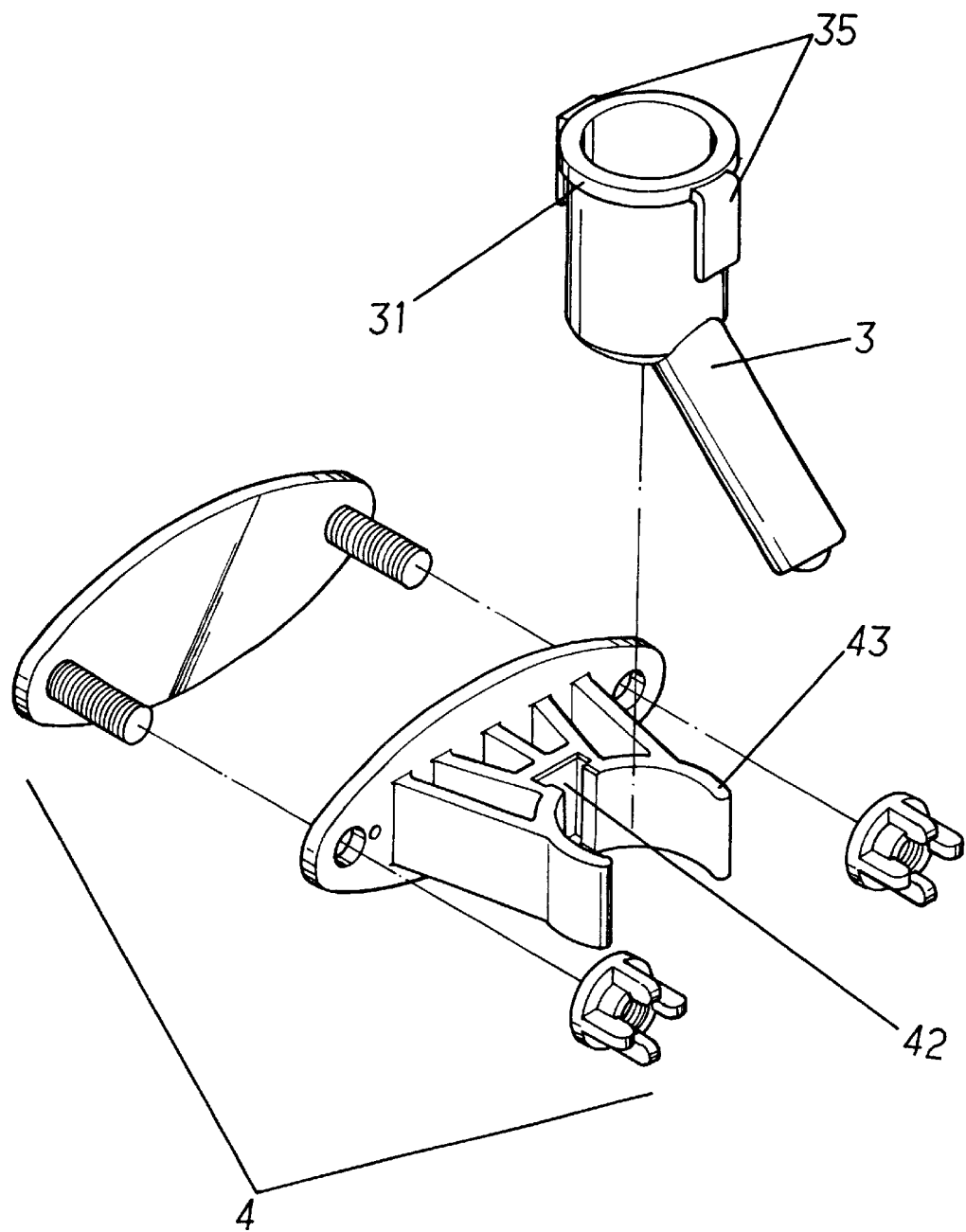
FIG. 4 is an exploded view of a drinking apparatus according to the present invention.

Referring to FIG. 4, a drinking apparatus for pets in accordance with the present invention is generally comprised of a water feeder 3 of substantially<-shaped profile and a mounting device 4. The water feeder 3 comprises a peripheral top flange 31 raised around the periphery of the circular top open side thereof, and two locating rods 35 of T-shaped cross section downwardly extended from the peripheral top flange 31 at two sides. The mounting device 4 comprises a C-shaped feeder holder 43, and a positioning groove 42 of T-shaped cross section transversely extended through a middle part of the C-shaped feeder holder 43. The C-shaped feeder holder 43 extends over 180°.

Figure 6:
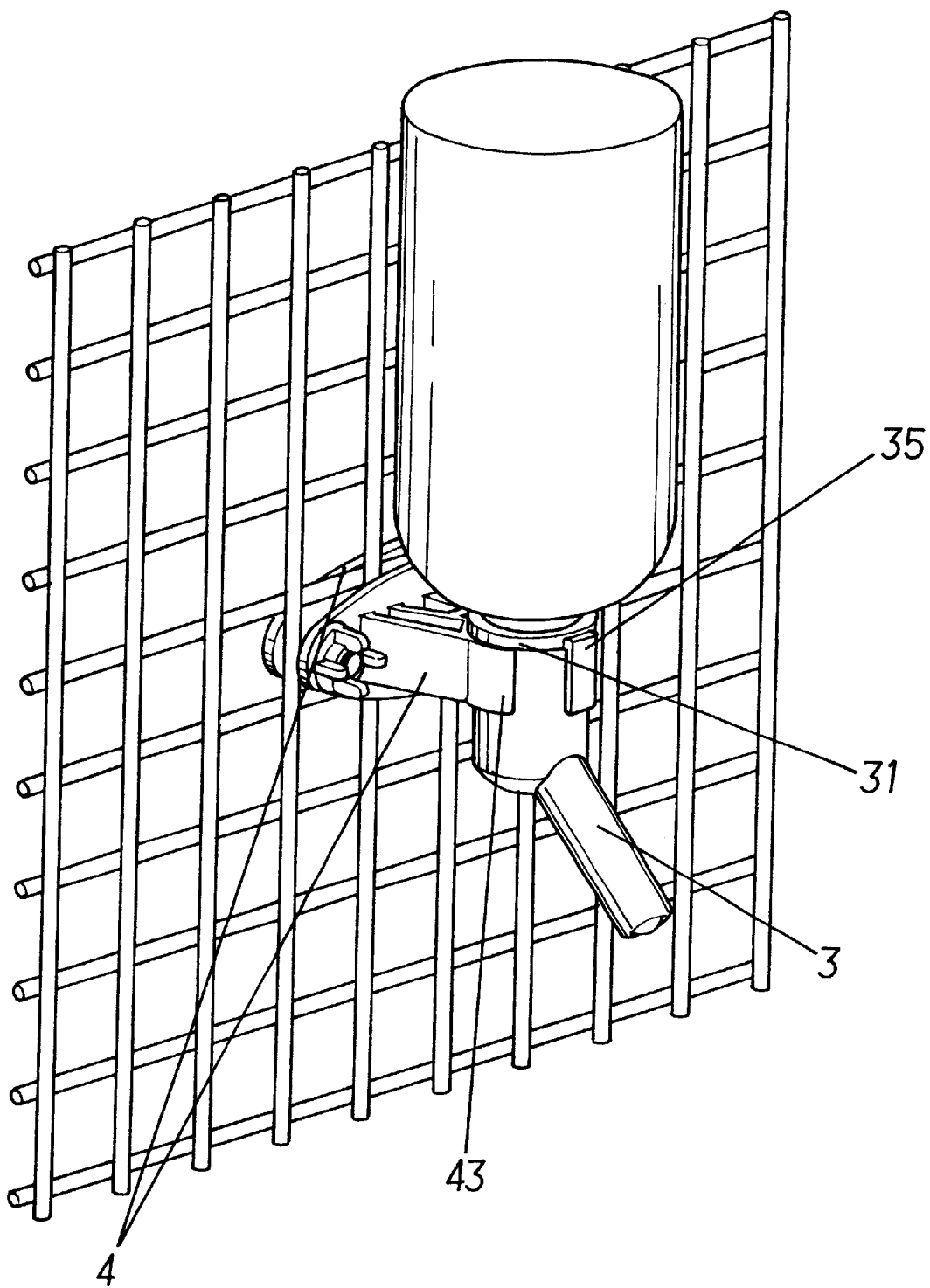
FIG. 6 is a perspective view showing the status of the drinking apparatus of the present invention after installation.

Referring to FIG. 6 and FIG. 4 again, after installation of the mounting device 4 in support means, the water feeder 3 is inserted into the C-shaped feeder holder 43 to force one locating rod 35 into engagement with the positioning groove 42, enabling the peripheral top flange 31 to be supported on the topside of the groove 42, preventing the water feeder 3 from rotary motion relative to the C-shaped feeder holder 43. The inner diameter of the C-shaped feeder holder 43 is approximately equal to the outer diameter of the water feeder 3. Because the C-shaped feeder holder 43 extends over 180° and the peripheral top flange 31 is supported on the topside of the C-shaped feeder holder 43, the water feeder 3 is stopped from falling out of the C-shaped feeder holder 43.

Figure 5:
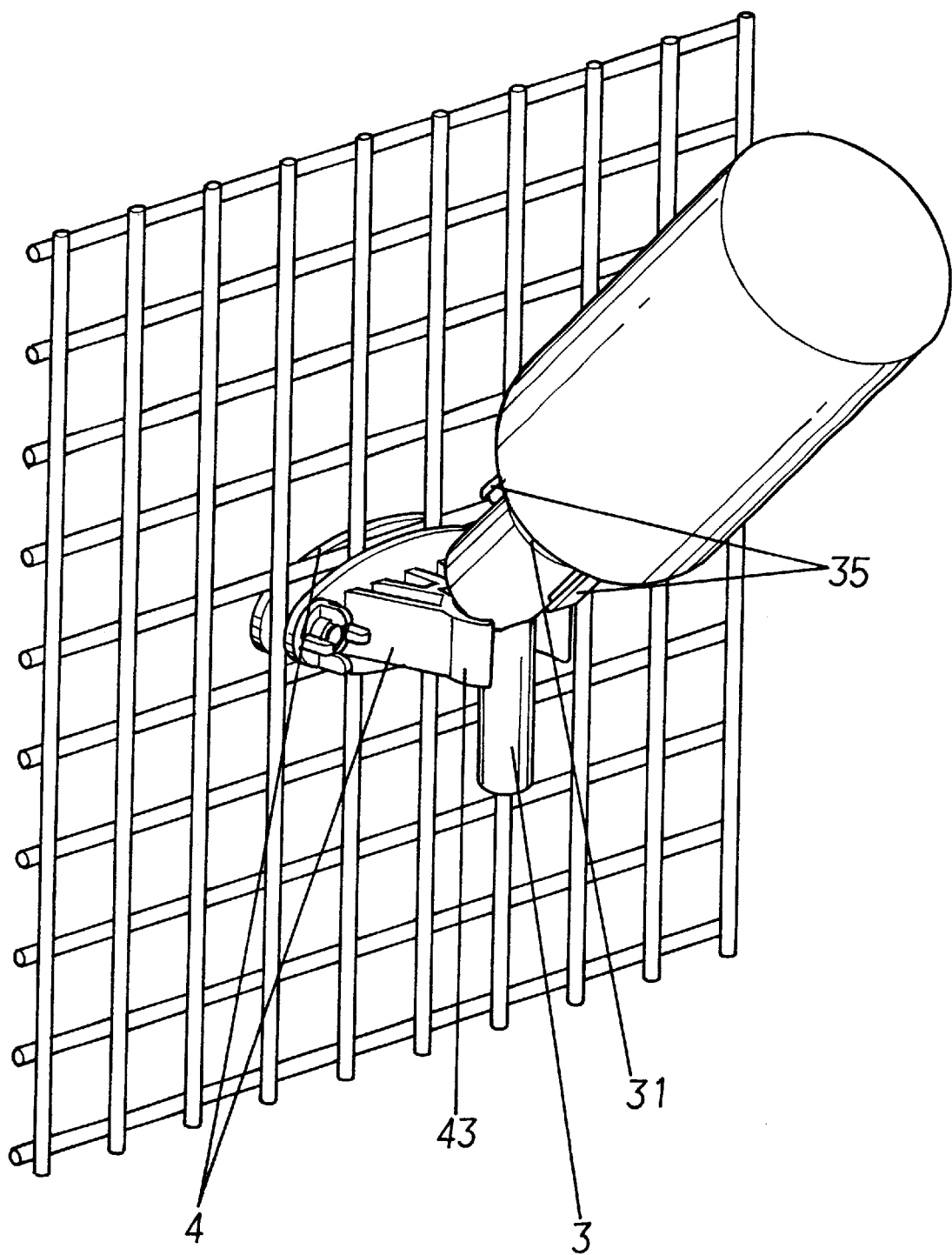
FIG. 5 shows the installation of the drinking apparatus according to the present invention.

Referring to FIG. 5 and FIG. 6 again, when fastening the water feeder 3 to the mounting device 4, the lower half of the water feeder 3 is held with the hand in vertical, keeping the upper half of the water feeder 3 in a tilted position (see FIG. 5), and then the upper half of the water feeder 3 is obliquely inserted into the C-shaped feeder holder 43, and then the water feeder 3 is turned in one direction to move the upper half of the water feeder 3 from a tilted position to a vertical position and forced downwards, keeping one locating rod 35 engaged into the positioning groove 42 and the peripheral top flange 31 supported on the topside of the C-shaped feeder holder 43 (see FIG. 6). When removing the water feeder 3 from the mounting device 4, the water feeder 3 is pushed upwards to disengage the respective locating rod 35 from the positioning groove 42, and then turn the water feeder 3 in one direction to move the upper half of the water feeder 3 from vertical to a tilted position, and then pull the water feeder 3 horizontally outwards from the C-shaped feeder holder 43.

While only one embodiment of the present invention has been shown and described, it will be understood that various modifications and changes could be made thereunto without departing from the spirit and scope of the invention disclosed. For example, a locating flange may be provided at the C-shaped feeder holder, and two positioning grooves may be provided at two sides of the upper half of the water feeder for coupling to the locating flange of the C-shaped feeder holder selectively.

What the invention claimed is:

1. A drinking apparatus for pets comprising a mounting device for mounting, said mounting device comprising a C-shaped feeder holder, and a water feeder mounted in said C-shaped feeder holder and adapted to provide a supply of water to pets, said water feeder comprising a peripheral top flange supported above said C-shaped feeder holder, and two locating rods downwardly extended from said peripheral top flange and adapted for fastening to said C-shaped feeder holder selectively, wherein said C-shaped feeder holder extends peripherally over 180° and comprises a transversely extended positioning groove for the positioning of one locating rod of said water feeder, said positioning groove having a T-shaped cross section; the locating rods of said water feeder have a T-shaped cross section fitting said positioning groove.

* * * * *